April 8, 1958

H. E. RIORDAN ET AL 2,829,526

MECHANICAL OSCILLATOR

Filed July 24, 1957

HUGH E. RIORDAN
JOHN DASSOULAS
INVENTORS

ATTORNEYS

April 8, 1958

H. E. RIORDAN ET AL 2,829,526

MECHANICAL OSCILLATOR

Filed July 24, 1957

HUGH E. RIORDAN
JOHN DASSOULAS
INVENTORS

BY

ATTORNEYS

April 8, 1958 H. E. RIORDAN ET AL 2,829,526
MECHANICAL OSCILLATOR
Filed July 24, 1957 3 Sheets-Sheet 3

HUGH E. RIORDAN
JOHN DASSOULAS
INVENTORS

BY
ATTORNEYS

2,829,526
MECHANICAL OSCILLATOR

Hugh E. Riordan and John Dassoulas, Silver Spring, Md., assignors to the United States of America as represented by the Secretary of the Navy Application July 24, 1957, Serial No. 673,987

5 Claims. (Cl. 74—25)

This invention relates generally to mechanical oscillators and more particularly to a mechanical oscillator for producing a sinusoidal motion with variable amplitude and frequency.

In testing and evaluating the performance characteristics of servomechanisms, it is obviously desirable that the tests be performed under conditions approximating those existing in actual operation. These conditions may be attained by providing appropriate test signals that will permit reliable frequency response data to be obtained. Among the quantities that are often measured under these conditions is angular position, and it becomes necessary to provide an adequate test signal to simulate the anticipated operational input signal. The test signal thus required is usually generated in the form of a sinusoidal signal from a source such as a mechanical oscillator.

In order that the most accurate frequency response tests results can be obtained, it is desirable that the output of the oscillator be supplied as rectilinear reciprocating motion and be coupled directly to the command shaft of the servomechanism. It is further desirable, in order to obtain reliable test data and also to expedite the evaluation process, that the magnitude of oscillation and frequency be capable of being varied while the oscillator is in operation.

It is, therefore, an object of the present invention to provide a mechanical oscillator that will produce a rectilinear reciprocating motion with a continuous sinusoidal wave form.

A further object of this invention is to provide a mechanical oscillator with a sinusoidal output that may be continuously varied with regard to amplitude and frequency while the oscillator is in operation.

Other objects and many of the attendant advantages of this invention will be readily appreciated as the same becomes understood by reference to the following detailed description when considered in connection with the accompanying drawings, wherein.

Briefly, the present invention comprises a rotating member with a second member attached obliquely thereto, a block slidably mounted on the second member, a clevis pivotally attached at its open end to the block and pivotally connected at its opposite end to a yoke which in turn is pivotally connected to two vertical legs of a cruciform member. The two horizontal legs of the cruciform member are journalled by pillow blocks, a pinion gear being keyed to one of the horizontal legs for the purpose of transmitting its resulting harmonic oscillation to a movable rack gear which transforms this oscillation into linear harmonic motion.

Figure 1:
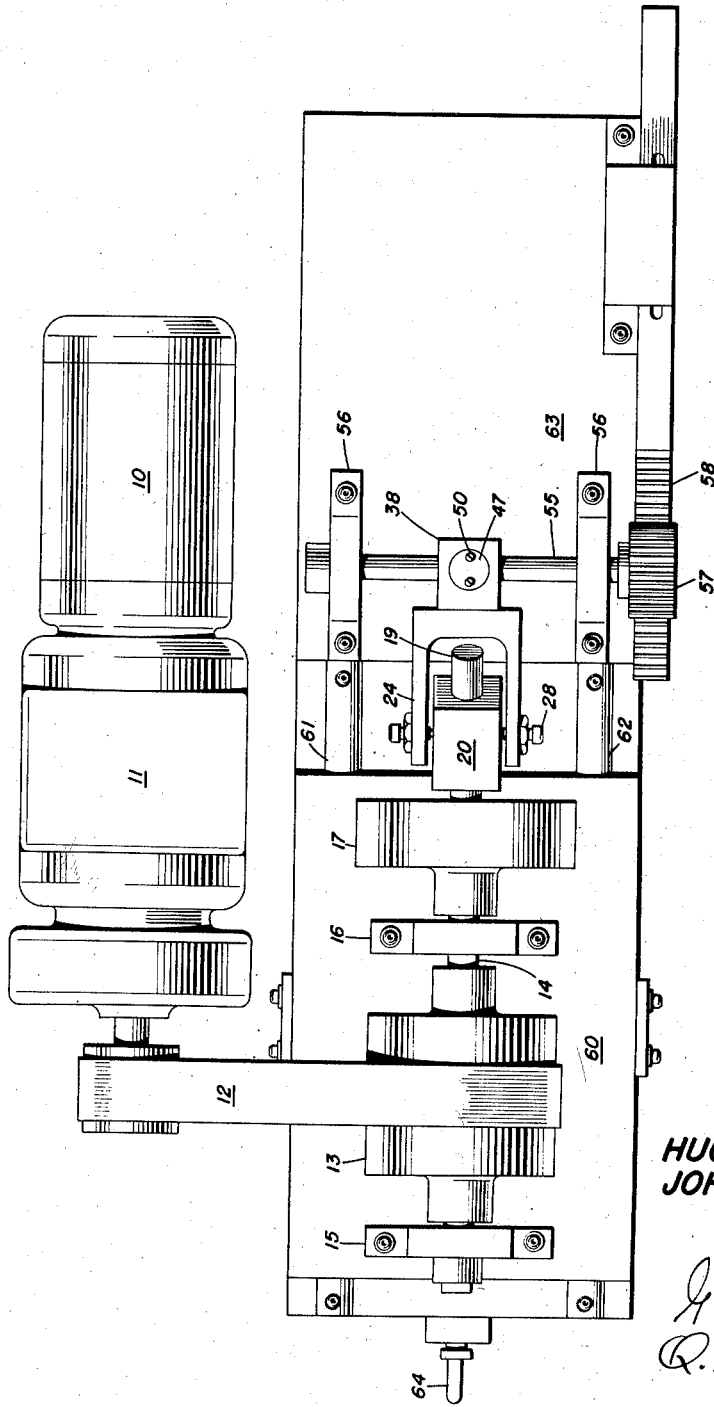
Fig. 1 is a plan view of the mechanical oscillator constituting the present invention, driven by an electric motor through a variable speed transmission.
Figure 2:
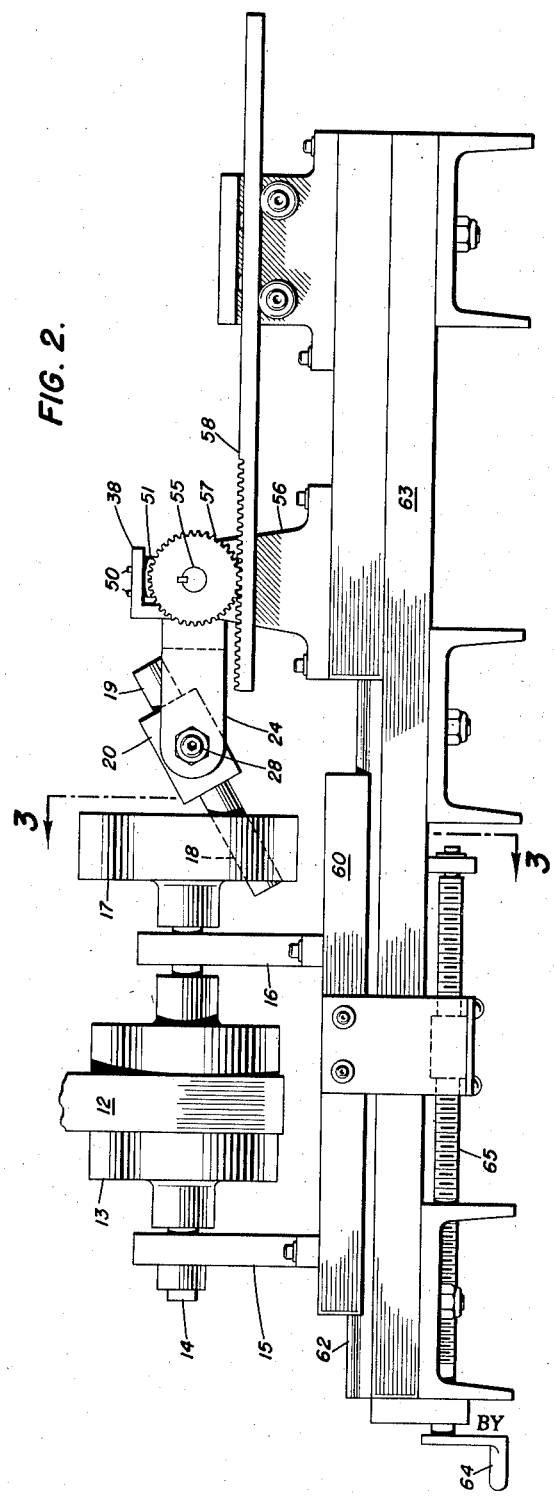
Fig. 2 is an elevation of the apparatus shown in Fig. 1.
Figure 3:
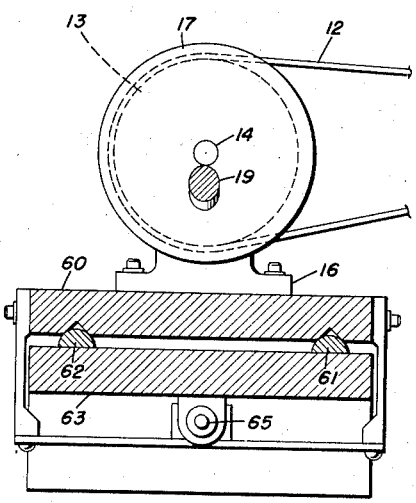
Fig. 3 is a section taken along line 3—3 of Fig. 2, major parts being shown in elevation.

Referring now to the drawings and first to Fig. 1, there is shown an electric motor 10 which drives a variable speed transmission 11 which, through a belt 12, drives pulley 13. The pulley 13 is keyed to a shaft 14 that is supported by two brackets 15 and 16. Also keyed concentrically to the shaft 14 at one end thereof, is a circular headstock 17 having an aperture 18 therein to receive a rod 19 of circular cross section. As best seen in Figs. 2 and 3, the aperture 18 is positioned eccentrically and is disposed along a radius of the headstock 17 at an angle of 30° to the axis of rotation. The rod 19 is of appropriate diameter to enable it to be forced into the aperture 18 and thus be secured to the headstock 17 by a drive fit, and is also of sufficient length to permit the protruding portion to intersect and extend beyond the axis of rotation.

Figure 4:
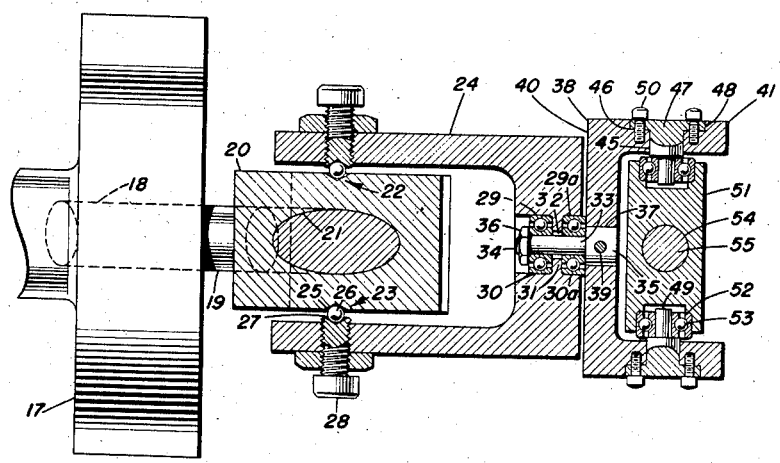
Fig. 4 is an enlarged detail view, partly in section, showing the connections of the sliding block to the clevis, of the clevis to the yoke, and of the yoke to the column (the clevis is shown as being pivoted 90° from the position shown in Figs. 1 and 2)

Slidably mounted on the rod 19 is a rectangular block 20 having a bore 21 extending therethrough to loosely receive said rod. Located at the center of two opposite sides of the block 20 and on a centerline lying in the same plane as, but perpendicular to, the longitudinal centerline of the bore 21 are pivot points 22 and 23 where a clevis 24 is pivotally attached to the said block. As shown in Fig. 4, a conical recess 25 is formed in the block 20 at each of the pivot points 22 and 23 to partially receive a steel ball 26 which in turn engages in a corresponding conical recess 27 formed in the end of a set screw 28 that is threaded in the clevis 24 at its open end. The opposite end of the clevis 24 is shaped to form inner and outer axially aligned recesses 29 and 29a to house, respectively, bearings 30 and 30a. Disposed between the two recesses 29 and 29a is a wall 31 having an aperture 32 extending therethrough to loosely receive a shaft 33. The shaft 33 is formed with a threaded portion 34 at one end and an enlarged diameter portion 35 at its opposite end, and is journalled by the two bearings 30 and 30a. A nut 36 engages the threaded portion 34 to mount the shaft 33 for rotation with respect to the clevis 24. The enlarged diameter portion 35 is pressed into an aperture 37 formed in a yoke 38 and is retained therein by a pin 39.

The yoke 38 is substantially C-shaped, having a bight 40 and legs 41, the aperture 37 being formed in the center of said bight. The legs 41 are provided, on a centerline perpendicular to the longitudinal centerline of the aperture 37, with openings 45, said openings being enlarged to form shoulders 46. A hub 47 having a flange 48, engageable with the shoulder 46, and a trunnion 49 is inserted in each of the openings 45 and retained therein by capscrews 50. Pivotally mounted between the two legs 41 by engagement with the trunnions 49 is a column 51 that is formed with recesses 52 at its opposite ends to receive bearings 53 which journal the trunnion 49. A circular aperture 54 is provided at the middle of the column 51 and extends diametrically therethrough.

Figure 5:
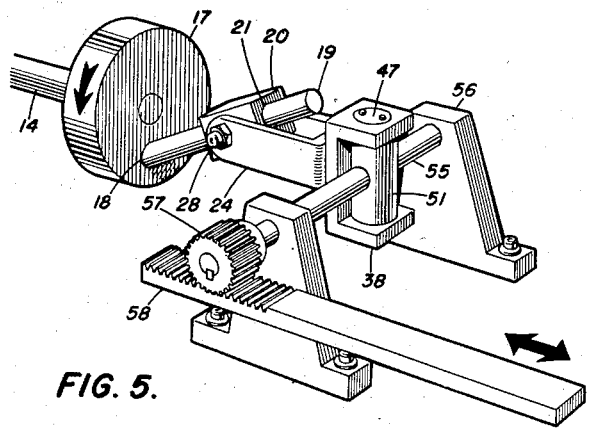
Fig. 5 is a detail perspective view of the mechanical oscillator.

As shown in Fig. 5, a shaft 55 is rigidly secured to the column 51 by a drive fit through the aperture 54 and is supported by two spaced, aligned brackets 56. Keyed to one end of the shaft 55 is a pinion 57 which meshes with a rack 58. The rack 58 is suitably supported to permit relatively free longitudinal oscillation thereof.

It is stressed at this point that proper alignment of the various components in the final assemblage is critical. Consequently, appropriate adjustment and close observation of tolerances should be made if an accurate production of a sinusoidal motion is desired.

In assembling the above described apparatus, it is important that the longitudinal centerlines of the shaft end of the clevis 24, the column 51, and the shaft 55 all intersect perpendicularly at a single point. It is also requisite that this point of intersection be on the axis of rotation.

The assembly including the pulley 13, shaft 14, brackets 15 and 16, headstock 17, and member 19 is mounted on a platform 60 that is movable on ways 61 and 62 of a base 63. The position of the platform is varied by a crank 64 which is attached to a conventional worm gear drive arrangement 65 beneath the base 63.

In operation, the variable speed transmission 11 drives the pulley 13, causing rotation of the headstock 17 and the rod 19. The frequency of the output motion is a direct function of the transmission speed. As the rod 19 rotates, the sliding block 20 and clevis 24 pick up the constant angular velocity rotation of the said rod and transmit it to the yoke 38 which in cooperation with the column 51 and shaft 55 transforms this rotation into harmonic oscillation of the pinion gear 57. This harmonic oscillation is then converted into rectilinear reciprocating motion by the rack gear 58 in conjunction with the pinion gear 57.

It is seen that if the sliding block 20 is centered on the axis of rotation of the shaft 14, that is with zero eccentricity, no motion is transmitted through the clevis 24 to the yoke 38. As the sliding block 20 is moved away from the axis of rotation, the eccentricity will cause the clevis 24 to describe an orbital path about the said axis in constant angular velocity rotation. This rotation is transmitted to the yoke 24 and the column 51 and transformed into harmonic oscillation of the shaft 55 which imparts this same motion to the pinion 57. The rack 58, in engagement with the pinion 57, then transforms this harmonic oscillating motion into linear harmonic motion. It is seen then, that the amplitude of the resulting motion is a direct function of the eccentricity of the block 20 in relation to the axis of rotation of the shaft 14. If the centerline of the block 20 coincides with the centerline of the shaft 14, the amplitude is zero. As the block 20 is moved along the rod 19 away from the centerline of the shaft 14, the amplitude increases.

This variation of the amplitude may be accomplished while the oscillator is in motion by merely turning the crank 64 a desired amount to move the platform 60 toward or away from the clevis 24. This movement is permissible since the block 20 slides on the member 19. As previously mentioned, the frequency of the output sinusoidal motion is variable by varying the speed of the motor 10.

Obviously many modifications and variations of the present invention are possible in the light of the above teachings. It is therefore to be understood that within the scope of the appended claims the invention may be practiced otherwise than as specifically described.

What is claimed is:

1. A mechanical oscillator for producing a continuous sinusoidal motion, comprising, a rotating headstock, a rod secured to said headstock and extending obliquely therefrom, a block slidably mounted on said rod, a clevis pivotally attached at its forked end to said block, a yoke swivelly mounted to the other end of said clevis, a cruciform member having vertical arms and horizontal arms, said vertical arms being pivotally connected to said yoke and said horizontal arms being journalled by support brackets, a pinion keyed to one of said horizontal arms, and a rack engageable with said pinion, whereby constant angular velocity rotation of said headstock and rod is converted into sinusoidal motion in the form of rectilinear reciprocating movement of said rack.

2. The apparatus as claimed in claim 1 with additional means to vary the amplitude of the resultant sinusoidal motion while said apparatus is in operation.

3. The apparatus as claimed in claim 2 wherein the means to vary the amplitude of the resultant sinusoidal motion include mounting means to maintain said support brackets in stationary position and means to provide a controllable movement of the said rotating headstock in relation to said support brackets, said movement being parallel to the axis of rotation of said rotating headstock, whereby the position of the block on said rod is changed thereby varying the eccentricity of said block with respect to the said axis of rotation to cause a change in amplitude of the resultant sinusoidal motion.

4. The apparatus as claimed in claim 3 wherein the means to provide the controllable movement includes a movable base on which the headstock is mounted, a way on which said base is carried, and means for imparting motion to said base.

5. A mechanical oscillator for producing a continuous sinusoidal motion, comprising, a rotating headstock, a rod secured to said headstock and extending obliquely therefrom, a block slidably mounted on said rod, a clevis pivotally attached at its forked end to said block, a yoke swivelly connected to the opposite end of said clevis, a cruciform member having vertical and horizontal arms, said vertical arms being pivotally connected to said yoke, and said horizontal arms being journalled in support brackets, whereby constant angular velocity rotation of said headstock and rod is converted into sinusoidal motion in the form of harmonic oscillation of said horizontal arms.

References Cited in the file of this patent

UNITED STATES PATENTS

| | | |
|---|---|---|
| 1,236,325 | Ljung | Aug. 7, 1917 |
| 2,757,543 | Allan | Aug. 7, 1956 |

FOREIGN PATENTS

| | | |
|---|---|---|
| 947,593 | Germany | Aug. 16, 1956 |